Apr. 10, 1923.

F. F. FORSHEE 1,451,539

ELECTRIC HEATING SYSTEM FOR IRONING MACHINES

Filed Feb. 14, 1921

WITNESSES:
A. L. Jeffreys
H. M. Biebel

INVENTOR
Frank F. Forshee
BY
Wesley G. Carr
ATTORNEY

Patented Apr. 10, 1923.

1,451,539

UNITED STATES PATENT OFFICE.

FRANK F. FORSHEE, OF FLINT, MICHIGAN, ASSIGNOR TO WESTINGHOUSE ELECTRIC PRODUCTS COMPANY, A CORPORATION OF MICHIGAN.

ELECTRIC HEATING SYSTEM FOR IRONING MACHINES.

Application filed February 14, 1921. Serial No. 444,728.

*To all whom it may concern:*

Be it known that I, FRANK F. FORSHEE, a citizen of the United States, and a resident of Flint, in the county of Genesee and State of Michigan, have invented a new and useful Improvement in Electric Heating Systems for Ironing Machines, of which the following is a specification.

My invention relates to electrically heated apparatus and particularly to electrically heated ironing machines and it has for one of its objects to provide a new system of control for electrically operated and electrically heated ironing machines.

Another object is to provide a method of so controlling the supply of energy to an electrically heated ironing machine as to permit of maintaining either the entire heating surface or of predetermined portions thereof at a substantially constant temperature.

Heretofore, ironing machines designed for use in the home have been motor operated and a few of the machines now on the market have been electrically heated but no comprehensive system of control for such machines has been provided.

In practicing my invention, I provide an ironing machine of the type in which an endless belt is caused to move over two rollers by means of an electric motor and I provide an electrically heated pressing shoe for resting upon the upper part of the belt to properly smooth the articles placed upon the belt and movable under the pressing shoe. I provide a heating element which is divided into a plurality of sections, each section being controlled by a manually-operable double-pole switch, one pole of which is used to control the circuit of a thermostat which is located in heat-receiving relation to the respective sections of the heating means. I provide further a double-pole manually-operable switch, one pole of which controls the circuit from all of the thermostats which are connected to an electromagnetically-operated plural-position switch which further automatically controls the circuit through all of the sections of the heating means.

In my copending application Serial No. 446,389 filed February 19, 1921, the general mechanical features of the ironing machine are described, and reference is made to this application for such details.

Figure 1:
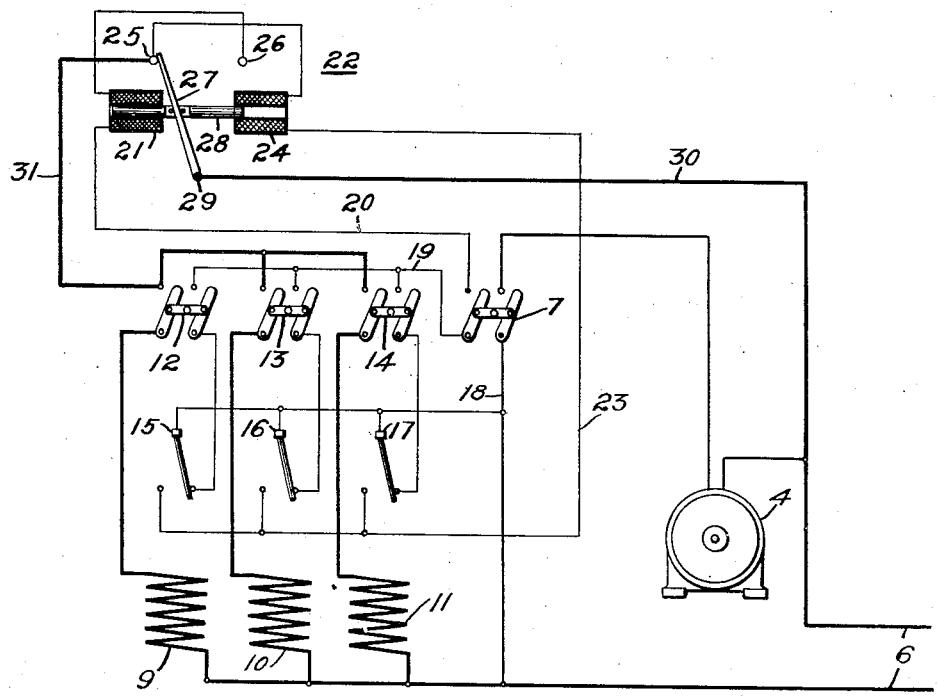
Figure 2:
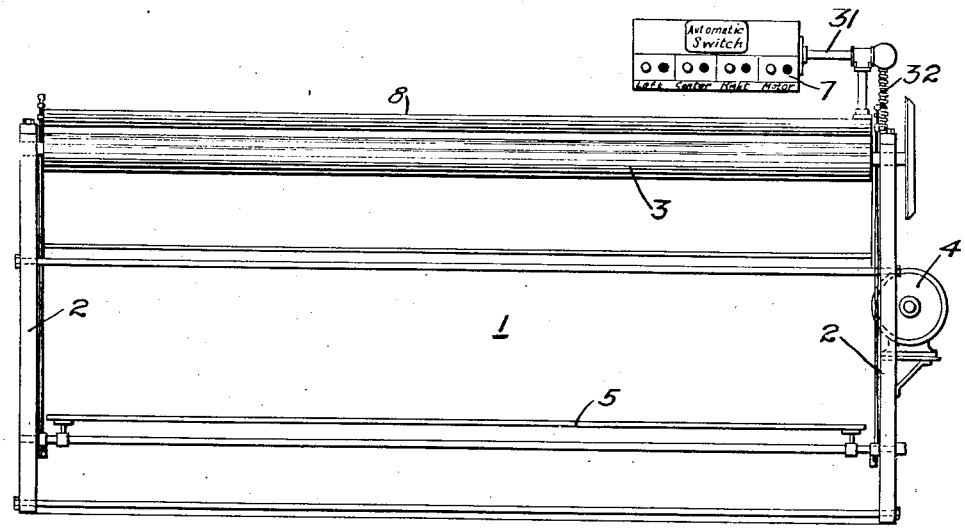

Referring to the single sheet of drawings, Figure 1 is a diagrammatic view of the circuits comprising my invention, as used in an ironing machine, and Fig. 2 is a view, in front elevation, of the general outline of the ironing machine in which the control circuit embodying my invention is incorporated.

An ironing machine 1 comprises, in general, side frames 2, a plurality of rolls 3, which are located in the same horizontal plane and in parallel axial alinement and an endless belt stretched over the two rolls 3 and caused to move by means of suitable driving mechanism actuated by a motor 4. The details of this driving mechanism are disclosed in the above-mentioned application and will not be specially described here. A treadle 5 is provided the operation of which is also described in the above-numbered application.

The motor 4 receives energy from a supply circuit 6, and the circuit through the motor is controlled by means of a manually-operable double-pole switch 7, only one pole of which is, however, used to control the motor circuit. A pressing shoe 8 is located above the top part of the endless belt, and a plurality of electric heating elements 9, 10 and 11 are located in the shoe 8. A plurality of double-pole manually-operable switches 12, 13 and 14 are provided, one pole of each of said switches being adapted to control the supply of energy to the respective heating elements 9, 10 and 11. The other pole of each of the switches 12, 13 and 14 controls the circuits of a corresponding number of thermostats 15, 16 and 17 which are located in heat-receiving relation to the respective heating elements 9, 10 and 11 in the shoe 8.

The fixed terminals of all of the thermostats are connected to one conductor 18 which is connected to one conductor of the supply circuit 6. The "low" contact terminal of the thermostat 15 is connected to one terminal of the switch 12, and the "low" terminals of the thermostats 16 and 17 are similarly connected to one terminal of the respective switches 13 and 14. All of the terminals of the switches 12, 13 and 14 to which the low contacts of the thermostats are connected are joined by the conductor 19 and connected to the second pole of the switch 7. This pole of the switch 7 is connected, by means of a conductor 20, to a coil 21 of the plural-position switch 22. All of the high contact terminals of the thermostats are connected together and, by means of a conductor 23, are connected to one terminal of the second actuating coil 24 of the switch 22.

The switch 22 is provided with two stationary contact terminals 25 and 26 which are adapted to be operatively engaged by a switch arm 27, the position of which is controlled by means of the coils 21 and 24 operating an armature 28. The arm 27 is pivotally mounted on a contact terminal 29 which is connected by means of a conductor 30 to one of the conductors of the supply circuit 6. The second terminal of the coil 21 is connected to the contact terminal 26, and the second terminal of the coil 24 is connected to the contact terminal 25. The contact terminal 25 is further connected, by means of a conductor 31, to the respective contact terminals of the switches 12, 13 and 14 which are adapted to control the supply of energy to the heating elements 9, 10 and 11.

The switch 22, which I designate the automatic switch, and the manually operable switches 7, 12, 13 and 14 may be mounted in any convenient position to be reached by the operator but I have shown them as mounted above the pressing shoe 8 and near the right-hand end of the ironing machine 1. The supply conductors for both the heating elements and the thermostats may be located in suitable conduit members 31 and 32 so that connection may be made between the switches and the heating elements and the thermostat located in the shoe 8.

If the machine has not been in use for some time, the thermostats 15, 16 and 17 will be substantially in the position shown in Fig. 1; that is, the bimetallic strip in each thermostat will be in operative engagement with the low contact. If the switch 22 is in the position shown in Fig. 1, it will be possible to energize the heating elements 9, 10 and 11 by manually closing the switches 12, 13 and 14. It will be sufficient to trace the current path through one of the heating elements, for example, the heating element 9. The current will flow from the one conductor of the supply circuit 6 through element 9 to the movable blade of switch 12, thence through the conductor 31 to terminal 25, through switch arm 27, to pivot 29 and from there through conductor 30 to the other conductor of the supply circuit. The shoe 8 may be raised by means of the treadle 5 and the raising mechanism connected thereto so that the endless belt may not be damaged.

The motor 4 may now be started by closing the manually operable switch 7 one blade of which controls the motor circuit and the other blade of which controls the circuit of the plurality of thermostats. When the shoe has reached the desired temperature, articles of clothing may be ironed in the usual manner by depositing them upon the endless belt and the operator will be able to watch them as they emerge from beneath the heated shoe.

If the temperature in any one of the sections of the shoe heated by the elements 9, 10 and 11 exceeds a predetermined value, the corresponding thermostat will move to engage the high terminal thereof. If the full width of the ironing machine is used, the section which will reach the predetermined temperature first will, in all probability, be the middle one and, in this case, thermostat 16 will operate to engage the high contact terminal. This closes an actuating circuit as follows: from one conductor of the supply circuit 6 through conductor 18 to thermostat 16, through conductor 23, through the coil 24 to contact terminal 25, switch blade 27 and conductor 30 to the other conductor of the supply circuit 6. This energizes the coil 24, causing it to attract the armature 28 and resulting in the blade 27 being disengaged from the terminal 25 and engaging terminal 26. This operation interrupts the current through all of the heating elements which may have been connected in circuit through the switches 12, 13 and 14. When the temperature in the hottest part of the shoe has reached a predetermined minimum value, as determined by the setting of the adjustable contact terminals of the thermostats, the bimetallic strip will engage the low contact, and the following control circuit will be energized. From the one conductor of the supply circuit 6, through conductor 18, thermostat 16, through one of the blades of the corresponding switch, for example, switch 13, through conductor 19, one of the blades of switch 7, conductor 20, coil 21, terminal 26, blade 27 and conductor 30 to the other conductor of the supply circuit. This energizes coil 21, causing it to attract its armature and move it into substantially the position shown in Fig. 1, re-energizing all of the heating elements 9, 10 and 11, which may be connected into circuit through the switches 12, 13 and 14. During the operation of the ironing machine, the thermostats will, therefore, be operated to maintain the temperature over substantially the entire shoe at any desired maximum value, interrupting the circuit whenever the temperature reaches or exceeds such value and again closing the circuit when a predetermined minimum temperature is reached. During all this time, it lies within the control of the operator to energize any desired number of sections, thus permitting greater economy in the use of energy for heating the shoe, as it is not necessary to continually energize all of the heating elements during such times as relatively narrow objects, as, for instance, handkerchiefs, are being ironed.

When it is desired to shut down the machine, switches 12, 13 and 14 may be operated to interrupt their respective circuits, and the motor switch 7 may then be operated to open both the motor circuit and the thermostatic-control circuit. Should the operator forget, however, to operate the switches 12, 13 and 14 and operate only switch 7 to stop the motor, the temperature in the shoe would rapidly reach a maximum value, and the thermostat, operatively associated with the heating element causing the high temperature would engage its high contact terminal, close the control circuit, as hereinbefore described, and cause the switch 22 to operate to interrupt the circuit through the heating elements.

It will be seen that I provide an all-electric ironing-machine which is automatic in its temperature regulation and in which the control circuit is interlocked with the motor circuit and is, therefore, operated in accordance with the operation of the motor circuit itself.

Various modifications may be made without departing from the spirit and scope of my invention and I desire that only such limitations shall be placed thereon as are imposed by the prior art or as are specifically set forth in the appended claims.

I claim as my invention:

1. In an electrically heated apparatus, the combination with a motor for driving said apparatus, a switch for controlling said motor circuit, and electric heating means for said apparatus, of circuit-controlling means for said heating means operated in accordance with said motor switch.

2. In an electrically heated apparatus, the combination with a motor for driving said apparatus, a switch for controlling said motor, and electric heating means for said apparatus, of circuit-controlling means for said heating means comprising a switch and a thermal-responsive device electrically interlocked with said motor switch.

3. In an electrically heated apparatus, the combination with a motor for operating said apparatus, a switch for controlling said motor, and electric heating means for said apparatus of a plural-position switch for controlling the energization of said heating means, and a thermal device for actuating said plural position switch, said thermal device being interlocked with said motor switch to cause energization of said heating means when said motor switch is closed and to permit of continuing the energization of said heating means after the motor switch is opened until a predetermined temperature is reached.

4. In an electrically heated apparatus, the combination with a stationary shoe, means movable relative to said shoe, and electrical heating means for said shoe, of thermal-responsive means for limiting the temperature rise in said shoe to a predetermined value when said movable means is being operated and for permanently interrupting the circuit through said heating means at said predetermined value when said movable means is not operated.

5. In an electrically heated apparatus, the combination with a stationary shoe, means movable relative to said shoe, a motor for operating said movable means, and a plurality of electrical heating means in said shoe, of a switch for controlling the energization of said heating means, and a plurality of thermal-responsive devices for actuating said control switch, said thermal-responsive devices being so interlocked with said motor circuit as to permit energization of said heating means when said motor is energized and to permit of continuing the energization of said heating means after the motor is de-energized until a predetermined temperature is reached.

6. In an electrically heated and electrically operated apparatus, in combination, a motor for driving said apparatus, a switch for controlling the circuit of said motor, an electric heating means for said apparatus, and means for controlling the energization of said heating means in accordance with the temperature of the device and the energization of said motor.

7. In an electrically heated and electrically operated apparatus, in combination, a motor for driving said apparatus, a switch for controlling the circuit of said motor, an electric heating means for said apparatus, a manually operable switch and a thermally controlled electro-magnetic switch connected in series circuit relation for controlling the energization of said heating element, said thermally controlled electromagnetic switch being electrically interlocked with said motor switch.

8. In an electrically heated and electrically operated apparatus, in combination, a motor for driving said apparatus, a switch for controlling the circuit of said motor, an electric heating means for said apparatus, a manually operable switch and an electromagnetic switch for controlling the energization of said heating element, said electromagnetic switch being operated in accordance with the temperature of the device and also in accordance with the energization of said motor.

9. In an electrically heated apparatus, in combination, a motor for driving said apparatus, a switch for controlling the circuit of said motor, an electric heating means for said apparatus, a manually operable switch and an electromagnetic switch for controlling the energization of said heating element, a temperature-responsive means for controlling the operation of said electromagnetic switch, said temperature-responsive means being interlocked with said motor circuit to permit energization of said heating means when said motor is energized and to permit of continuing the energization of said heating means after the motor is de-energized until a predetermined temperature of the apparatus is reached.

In testimony whereof, I have hereunto subscribed my name this 3rd day of Feb. 1921.

FRANK F. FORSHEE.